United States Patent [19]

Simmons et al.

[11] 3,947,669

[45] Mar. 30, 1976

[54] VOTING MACHINE

[75] Inventors: William W. Simmons, Greenwich; James A. Marquis, Danbury, both of Conn.

[73] Assignee: Applied Futures, Inc., Greenwich, Conn.

[22] Filed: Dec. 30, 1974

[21] Appl. No.: 537,408

[52] U.S. Cl. .................... 235/156; 235/51; 235/52; 340/332

[51] Int. Cl.$^2$.................... G06F 15/20; G07C 13/00

[58] Field of Search ............. 235/156, 50 A, 51, 52, 235/54 F, 56; 340/332; 35/48 R

[56] References Cited

UNITED STATES PATENTS

| | | | |
|---|---|---|---|
| 3,722,793 | 3/1973 | Aronoff | 235/50 A |
| 3,748,646 | 7/1973 | Schultz et al. | 235/52 X |
| 3,766,541 | 10/1973 | Gordon et al. | 340/332 |
| 3,793,505 | 2/1974 | McKay et al. | 235/51 X |

*Primary Examiner*—Malcolm A. Morrison
*Assistant Examiner*—Jerry Smith
*Attorney, Agent, or Firm*—Cooper, Dunham, Clark, Griffin & Moran

[57] ABSTRACT

An electrical voting machine is disclosed which uses digital circuits to allow each of a number of voters to (1) select one of a number of alternative answers to a question and (2) express a selected degree of confidence in the selected answer, and then combines digitally the voter selections, and displays indications reflecting both the answer distribution and the degree of confidence of the voter group in the selected answers. Additionally, the machine calculates and displays: the total number of voters, a downcount of the number of voters as their votes are tallied, a weighted mean of the answer curve, an error signal if the number of votes exceeds the number of voters or if there is a circuit failure, and an error condition if an attempt is made to tally the votes before all voters have voted.

13 Claims, 5 Drawing Figures

VOTING MACHINE

BACKGROUND OF THE INVENTION

The invention relates generally to measuring and displaying the vote on a given question by a group of voters, and is specifically directed to providing an improved method and device wherein the degree of confidence of the voters in their votes on a question is measured and indicated together with the votes. Still more specifically, the invention is an improvement over the voting machine disclosed in Gordon et al. Pat. No. 3,766,541 which relates to an analog voting machine of this type.

Voting machines of the type disclosed in said Gordon et al. patent have certain disadvantages associated primarily with their nature as analog machines. Specifically, machines of this type may have to be recalibrated each time the number of voters changes and may have to be further recalibrated to compensate for factors such as temperature changes, component aging, supply voltage variations and the like. Such recalibration may require highly trained personnel and measuring instruments to ensure the desired result. Further, voting machines of the type discussed above calculate and display only a limited number of parameters associated with the vote of a group of voters.

SUMMARY OF THE INVENTION

An object of the invention is to provide an improvement over the voting machines of the type discussed above. A specific object is to provide a voting machine and method which can easily and conveniently accommodate different numbers of voters, which can provide useful indications of the voting process that have not been provided by prior art voting machines and methods, and which are simple in operation and do not need recalibration.

The invented voting machine comprises a number of voter terminals, one for each voter, a display panel, a central control circuit connected to each voter terminal and to the display panel, and a remote control terminal connected to the central control. Each voter terminal is operated by a voter to establish therein an electrical circuit representing the voter answer to a question and to establish therein another electrical circuit representing the degree of confidence of the voter in the selected answer. When all voters have made their selections, the central control circuit scans the voter terminals to derive from each a digital electrical signal representing the selected answer and a digital electrical signal representing the degree of confidence of the voter in the selected answer. The central control circuit combines the derived digital signals with each other to provide voting result signals suitable for display. Specifically, the central control circuit derives a denominator digital signal corresponding to the cumulative degree of confidence of all voters in all answers given thereby. Additionally, the central control circuit derives, for each of the several possible answers, a numerator signal representing the cumulative degree of confidence of all voters in that answer. The display has a column for each of the several possible answers to the question. Each column is illuminated up to a height corresponding to the ratio (on a scale of 100) between the numerator signal for that answer and the denominator signal. Thus, the illuminated columns provide a histogram display which reflects not only the percentage of the votes for each answer, but also the degree of confidence of the voters in the selected answers.

Additionally, the invented voting machines may be energized to combine the voting results discussed above so as to provide and display a weighted mean of the displayed histograms, thereby providing a further indication of the thrust of the votes.

Still additionally, the machine provides and displays: an indication of the cumulative degree of confidence of all voters in the answers given by them, thereby providing an additional indication of the quality of the vote; a signal indicating the total number of voters taking part in each vote, this number being decremented as the vote progresses and votes are tallied; and, an error condition if an attempt is made to tally the votes before all voters have voted of if a voter attempts to vote twice, thereby providing a further check on the voting process.

DETAILED DESCRIPTION

Figure 1:
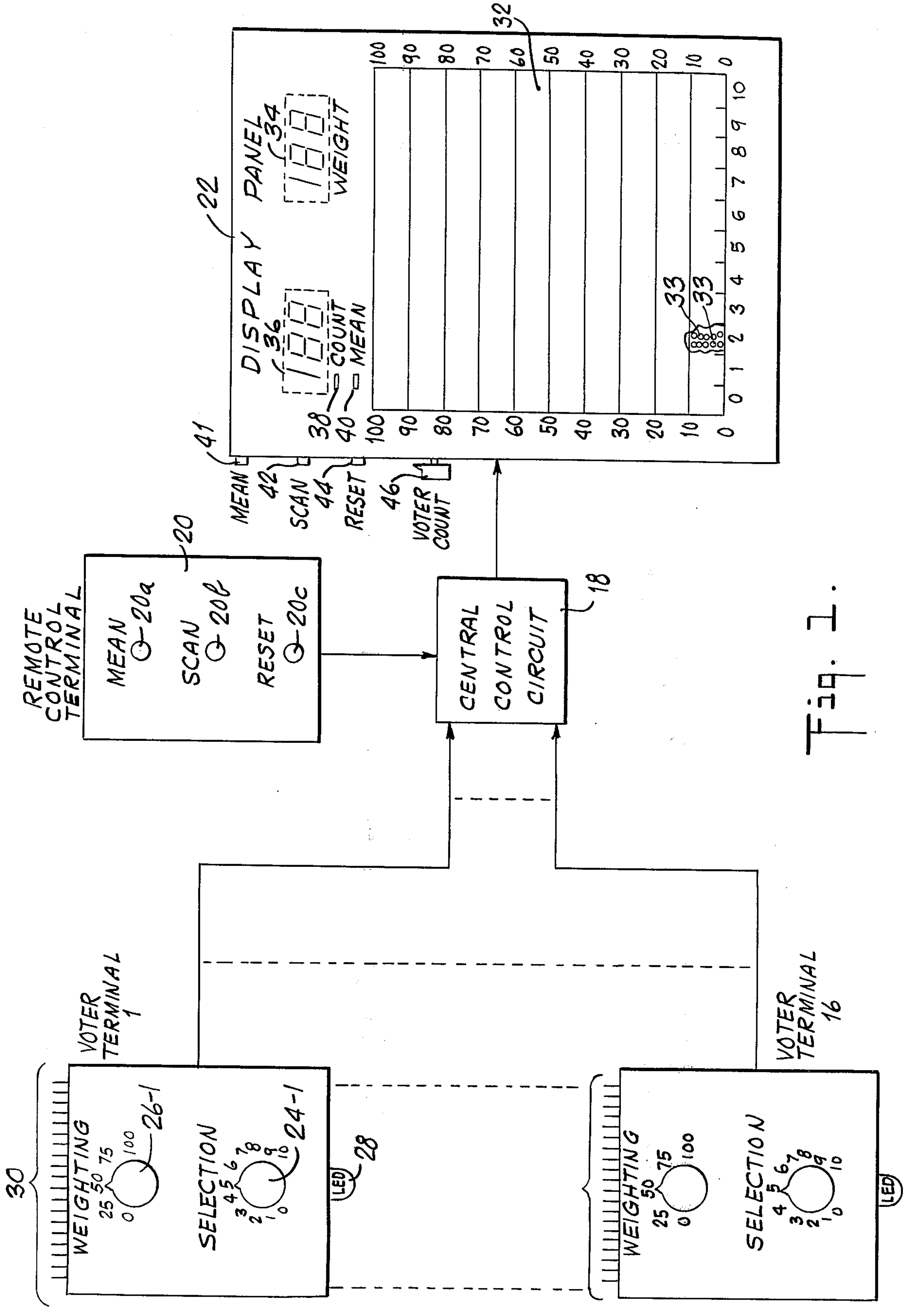
FIG. 1 is a functional block diagram of the invented voting machine.

Referring to FIG. 1, the voting machine comprises four major parts: voter terminals 1–16, a central control circuit 18, a remote control terminal 20, and a display panel 22. The 16 voter terminals are identical and each comprises a ten-position selector switch 24, a five-position weighting switch 26, an indicator light 28 and a row of connector pins 30, of course, the number of voter terminals and the number of positions of each selector switch 24 and weighting switch 26 are arbitrary, and any other suitable numbers may be chosen. The remote control terminal 20 comprises three manual switches: a switch **20*a* labelled "mean", a switch 20*b* labelled "scan" and a switch 20*c* labelled "reset". The display panel 22 comprises 11 vertical columns 12 labelled "0 through 10", a three-digit display 34 which is labelled "weight", a three-digit display 36 which has a label "count" next to an indicator light 38 and a label "mean" next to an indicator light 40, a manual switch 41 which is labelled "mean", a manual switch 42 which is labelled "scan", a manual switch 44 which is labelled "reset" and a 16-position switch 46 labelled "voter count". The selection switch 24 of each voter terminal is used to register the answer of a voter to a question. For example, if the question calls for a "yes" or "no" answer, the voter manually places the selector switch 24 at the zero position for a "no" answer and at the ten position for a "yes" answer. If the question calls for one of eleven (or less) alternative answers to the question, the voter manually places the selector switch 24 at the position corresponding to the answer selected by him. If the question calls for indicating an increment, the voter answers by placing the selector switch 24 at a selected numerical position. Thus, the selection switch 24 provides up to 11 discrete selections or alternative responses to a particular question. The weighting switch 26 is used to register the degree of confidence of the voter in the selected answer. The term "degree of confidence" is used here in a generic sense and refers to any qualification of an answer, e.g. a qualification reflecting the strength of opinion that the voter has when making a selection, the confidence of a voter in his answer of judgment, or any other qualifications as to the vote, such as the experience of the voter, his degree of involvement with a given issue, his knowledge of a subject, etc. The weighting switch 26 has five positions labelled "0%, 25%, 50%, 75% and 100%. The three switches of the remote control 20 are used as follows: the reset switch 20c is manually energized to reset all appropriate circuits in the voting machine prior to a new vote; the scan switch 20b is energized to start the tallying of the votes; and the mean switch 20a is energized if it is desired to calculate and display a weighted mean of the tallied votes. The central control circuit 18** contains the necessary control circuits for operating the voting machine in accordance with the invention.

In operation, the voter count switch 46 in the display 22 is set to the number of voters which are to participate in a vote. A question is then announced and each voter sets the selection switch 24 and the weighting switch 26 of his voter terminal in accordance with his vote on the question. The voters then connect their voter terminals to the machine by plugging in the connector pins 30 into the appropriate connector board (not shown) to thereby establish the necessary electrical connection between the participating voter terminals and the central control circuit 18. The term "electrical connection" is used generally, and includes a wireless radio link as well as a hard-wired connection by electrical cable. To start tallying the vote, either the scan switch 42 of the display panel 22 or the scan switch 20b of the remote control 20 is operated. The central control 18 scans the plugged-in voter terminals in sequence to first accumulate a number representing the sum of all settings of the weighting switches 26 of the voter terminals. The numbers 0, 1, 2, 3, and 4 are assigned to the five positions of each weighting switch 26 (0 for 0%, 1 for 25%, etc.), so that the maximum number of weights is 64 -- when each switch 26 is set at the 100% mark and there are 16 voters. The accumulated number of weights is divided by the maximum number of total weights for the number of voters taking part in the vote, and the result is displayed on the three-digit display 34. For example, if ten voters are taking part in the vote, there are ten voter terminals, the maximum number of weights is 40 and if each voter indicates 100% confidence in the vote, the number displayed on the three-digit display 34 is 100. If each of the ten voters selects a 25% confidence in the vote, then the number displayed at the three-digit display 34 is 25 (corresponding to the ratio of 10 to 40). Thus, the weight display 34 displays a number which indicates the cumulative confidence of the voters in their votes but does not identify the individual choices of the voters or the confidence of an individual voter in his answer. When the voter count switch 46 is set to the selected number of voters, the corresponding number is displayed at the three-digit display 36 and the indicator light 38 is lit to indicate that the displayed number is the number of participating voters. As each voter terminal is scanned by the central control 18 in the course of accumulating the weights selected by the voters, the number displayed at display 36 is dimensioned. When all participating voter terminals have been scanned, the display 36 should be blank. If it is not, either less than all the voters have voted, in which case a number other than 0 is displayed at display 36, or a voter has attempted to vote twice, in which case an E (for error condition) is displayed. While the number of participating voters is being displayed at the three-digit display 36, the indicator light 38 labelled "count" on the display panel 22 remains lit. In a second scan, the central control 18 again scans each participating voter terminal, but this time finds the number of weights given by the voters to the individual answers. The central control 18 then divides, for each of the 11 possible answer selections, the number of weights given by all the participating voters to that answer selection by the total number of weights given by all voters to all answer selections. The resulting ratio, normalized on a scale of 100, is displayed (but only after all vote taking is completed) by illuminating the corresponding one of the eleven columns 32 of the display 22 to a corresponding height. The illuminated portions of the columns 32 thus provide an illustration of the consensus of the voters. For example, a bell-shaped curve indicates consensus, and the taller of the curve, the more harmonious the thinking of the voters. A bimodal curve indicates either a polarity of opinion and no consensus, or a misunderstanding of the question. A low, wide curve shows diversity of opinion. If the mean switch 20a (or 41) is energized on the remote control 20 (or panel 22), then the central control 18 calculates a weighted mean of the ratios displayed on the columns 32, and displays the calculated number on the display 36, as a two-digit number on a scale of 10. While the weighted mean is being displayed, the indicator 40 labelled "mean" on the display panel 22 is lit and the indicator light 38 is off.

Figure 2:
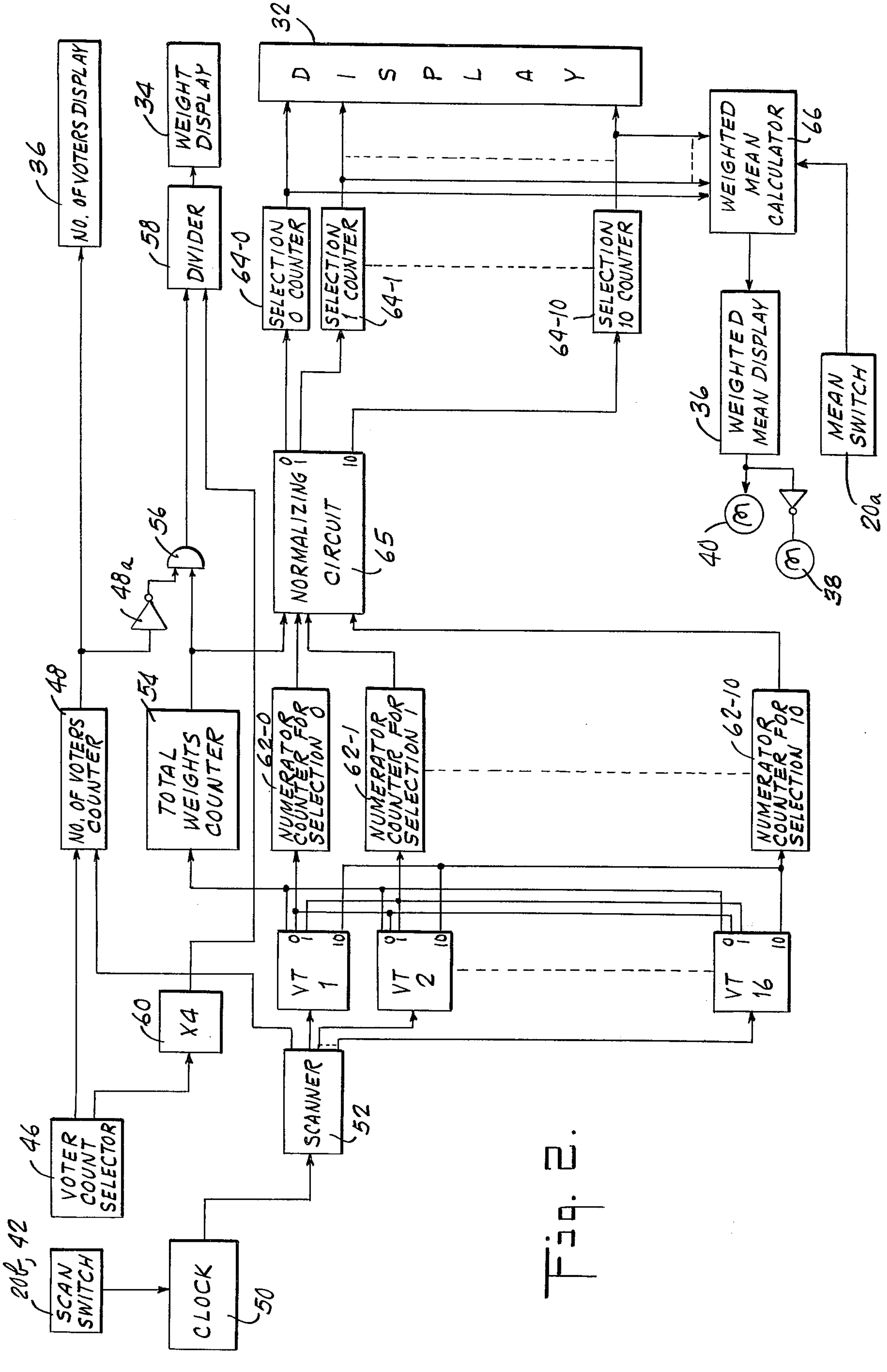
FIG. 2 is a more detailed functional block diagram of the voting machine.

A more detailed functional block diagram of the invented voting machine is shown in FIG. 2. The number of voters participating in the vote is set at the voter count selector 46 and a counter 48 is set to a corresponding count. The contents of the counter 48 are displayed at the display 36. When the scan switch 20b of the remote control 20 or the scan switch 42 at the display panel 22 is energized, a clock 50 is turned on and a scanner 52 starts applying the clock pulses from the clock 50 to the voter terminal which is first in position and has been plugged into the voting machine. The first voter terminal has an output which is applied to a total weights counter 54, and passes to the output up to four successive clock pulses from the clock 50, with the number of pulses depending on the setting of the weighting switch 26 of the voter terminal. If the weighting switch 26 is set to 0%, no clock pulses are passed to the counter 54; if the switch 26 is set to 25%, one clock pulse is passed onto the counter 54, etc. After the first voter terminal has been scanned in this fashion, and the clock pulses (if any) passed thereby have been counted in the counter 54, the scanner 52 starts applying the clock pulses to the second voter terminal, to thereby add to the contents of the counter 54 a number of clock pulses corresponding to the setting of the weighting switch 26 of the second voter terminal, etc., until all voter terminals plugged into the machine have been scanned in this manner and the counter 54 has accumulated a number corresponding to the sum of all the weights chosen by all the participating voters for all the answer selections. Each time the scanner 54 finishes applying clock pulses to a voter terminal, it applies a signal to the number of voters counter 48 to decrement its contents. Thus, each time a voter terminal is tallied, the number displayed at the number of voters display 36 is decremented by 1 until the display 36 is blanked out when all voter terminals have been scanned. When the counter 48 has counted down to zero, its output to an inverter 48*a* is zero, and the 1 output of the inverter 48*a* enables an AND-gate 56 to thereby apply to a divider 58 the contents of the total weights counter 54. The other output of the divider 58 is from a multiplying circuit 60 which multiplies by 4 the number of voters provided by the selector 46. The divider 58 therefore provides at its output the ratio of the total weights provided the participating voter terminals and the maximum number of weights possible for the participating voters, i.e., a normalized total weights number which indicates the overall confidence of the voters in their votes on a scale of 100. The output of the divider 58 is applied to the weight display 34 of the display 22 panel to be displayed thereon. Note that the weight display 34 is not energized until each participating voter terminal has been scanned and has been scanned only once (if the output of the number of voters counter 48 is anything but 0, the inverse thereof keeps the AND-gate 56 disabled). The scanner 52 then starts the second scan by again applying the output of the clock 50 to the first voter terminal. The voter terminal has 11 outputs corresponding to the 11 possible selections of the switch 24. During this second scan each voter terminal passes to the output corresponding to the setting of its selection switch 24 up to four pulses from the clock 50, with the number of passed pulses corresponding to the setting of the weighting switch 26. Thus, if the selection switch 24 is set at 9 and the weighting switch is set at 75%, the voter terminal 1 applies three clock pulses to its output line corresponding to selection 9. There are 11 numerator counters 62–0 through 62–10, and each of the 11 outputs of each voter terminal is connected to the corresponding numerator counter. Each numerator counter accumulates a count of the clock pulses applied thereto and each of the voter terminals is scanned in a similar manner. Thus, if each of the first and second voter terminals applies three clock pulses to the numerator counter 62–1, and no other voter has made selection No. 1, the numerator counter 62–1 will contain the count of 6 at the end of the second scan. When the second scan is completed, each of the numerator counters contains a count corresponding to the number of weights chosen for the corresponding answer by the voters. The contents of each of the numerator counters are applied to a normalizing circuit 65, where the contents of each of the numerator counters 62–0 through 62–10 are divided by the contents of the total weights counter 54. The resulting ratios, as represented on a scale of 100, are stored in the correspondingly numbered selection counters 64–0 through 64–10, and the 11 display columns 32 of the display panel 22 are illuminated to a height corresponding to the contents of the correspondingly numbered selection counter 64. If the mean switch 20*a* of the remote control 20 (or the mean switch 41 of the panel 22) is energized at this time, the contents of the selection counters 64–0 through 64–10 are applied to a weighted mean calculator 66 which multiplies the contents of each of the counters 64 by the counter number and divides the resulting sum by 10 to thereby provide a two-digit number ranging from 0 through 10. The resulting number is applied to the weighted mean display 36, the "mean" indicator 40 on the display panel 22 is lit and the "count" indicator 38 is disabled. Note that the same display 36 was used for the number of voters in the course of the first scan, but has already been blanked out and is now used for a different purpose.

Figure 3:
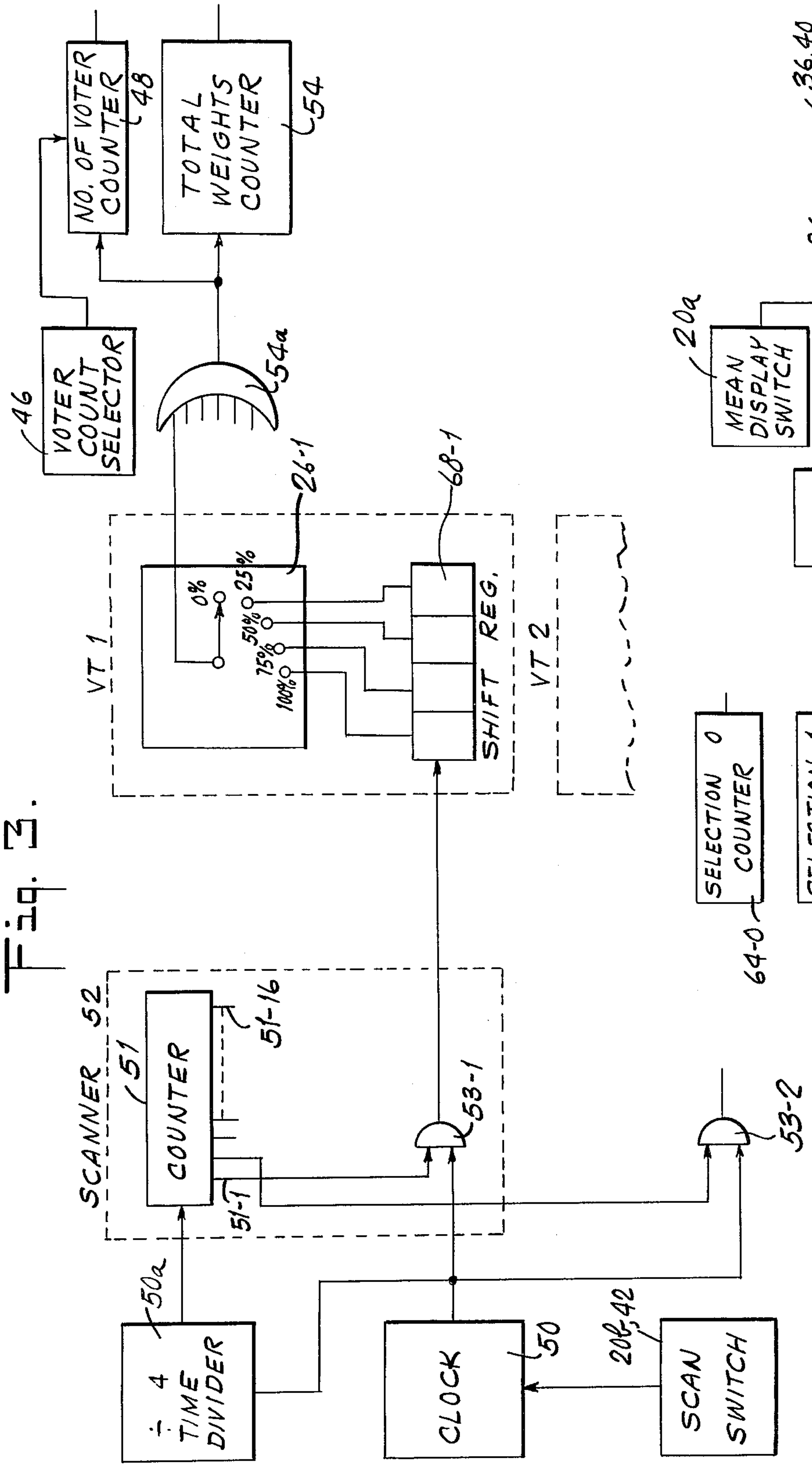
FIG. 3 is a block diagram illustrating the portion of the machine involved in measuring the cumulative degree of confidence of the voters in the selected answers.

FIG. 3 illustrates in greater detail the portion of the invented voting machine involved in measuring the cumulative degree of confidence of the voters in the selected answers. The scanner 52 comprises a counter 51 having thirty-two outputs 51–1 through 51–32 (only sixteen outputs are shown in FIG. 3) and 16 AND-gates 53–1 through 53–16, with each of the shown outputs of the counter 51 connected as an input to the correspondingly numbered AND-gate and with the output of each AND-gate connected to the correspondingly numbered voter terminal. Each voter terminal includes a serial four-stage shift register 68 receiving the output of the correspondingly numbered AND-gate 53. The weighting switch 26 of each voter terminal comprises a switch which connects any selected stage of the shift register 68, or none of the stages, to an OR-gate 54 whose output is connected to the UP-count input of the total weights counter 54 and to the DOWN-count input of the number of voters counter 48. Each of the remaining voter terminals include identical components and is connected to its correspondingly numbered AND-gate 53 and to the OR-gate 54*a* in the same manner; the remaining voter terminals are therefore not shown.

In operation of the circuit shown in FIG. 3, the clock 50 is turned on at the beginning of the first scan by the manual energizing of either the scan switch 20*b* or the scan switch 42. The clock then starts applying clock pulses to a time divider 50*a* and to each of the AND-gates 53. The counter 51 of the scanner 52 is a ring counter and only its first output 51–1 is energized for the first four clock pulses, only its second output 51–2 is energized for the second four clock pulses, etc. Therefore, only the AND-gate 53–1 for the first voter terminal is enabled for the first four clock pulses, only the second AND-gate 53–2 is energized for the second four clock pulses, etc. Depending on the setting of the weighting switch 26–1, the first voter terminal passes to the OR-gate 54*a* only the number of clock pulses corresponding to the number of weights selected by the first voter. Thus, if the first voter selects zero weights, the sweep contact of the switch 26–1 is not connected to any of the stages of the shift register 68 and no clock pulses pass onto the OR-gate 54*a;* if the sweep contact of the switch 26–1 is connected to the last stage of the shift register 68, only the fourth clock pulse (i.e. only one pulse) passes on to the OR-gate 54*a*, etc. Each clock pulse passed to the OR-gate 54*a* is counted up by the total weights counter 54 and simultaneously decrements the contents of the number of voters counter 48. After the first four clock pulses, the AND-gate 53–1 for the first voter terminal is disabled and the AND-gate 53–2 is enabled for the subsequent four-clock pulses, etc. At the end of the first scan, the total weights counter 54 contains a number representing the total weights assigned by all of the participating voters to all of the answers selected by them, and the number of voters counter 48 contains zero, provided that the voter counter selector 46 was set correctly to begin with and provided that each participating voter has voted, but only once.

Figure 4:
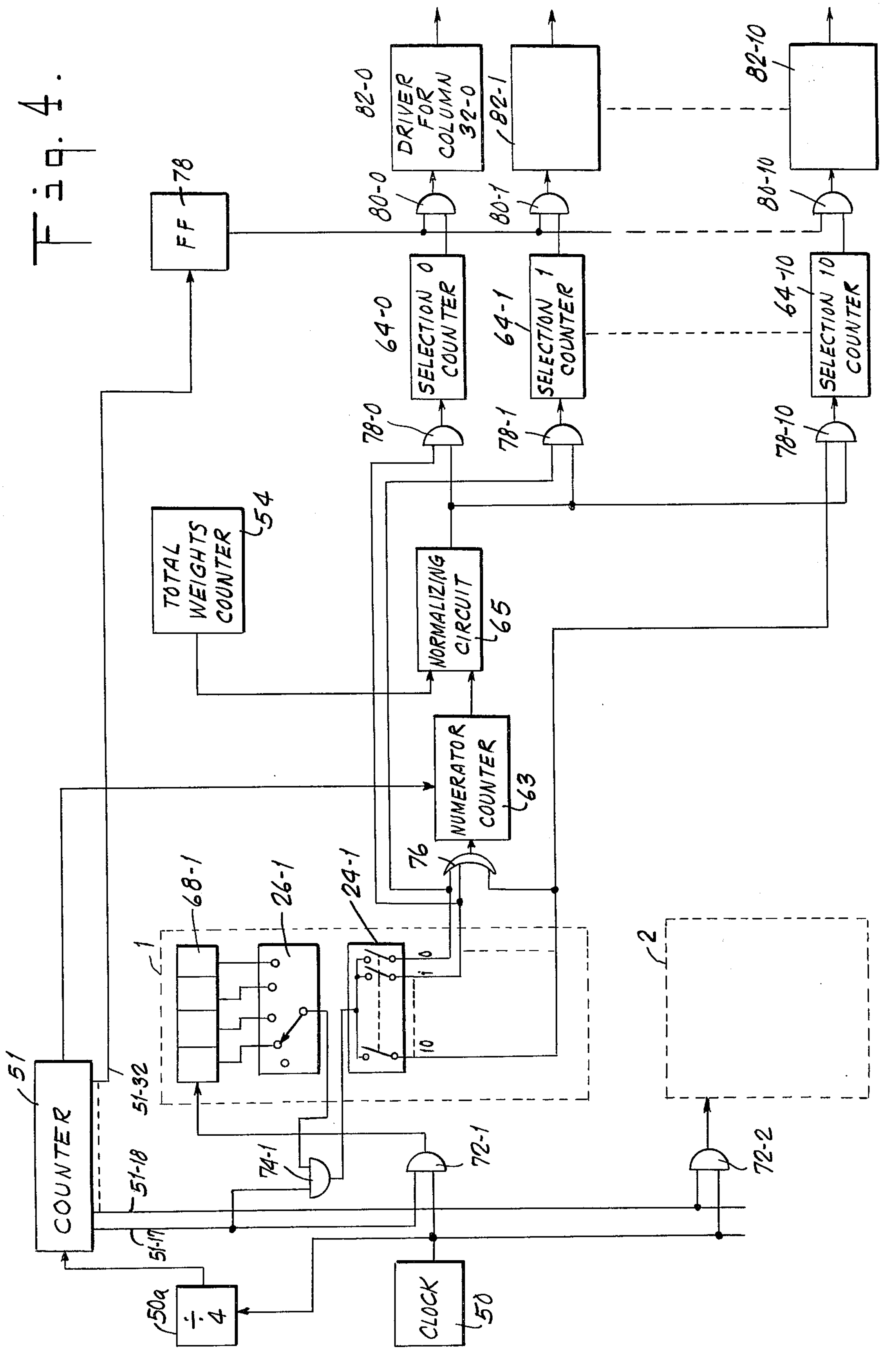
FIG. 4 is a block diagram of the portion of the machine involved in providing electrical signals for displaying normalized histograms representing the voter selections.

FIG. 4 shows in greater detail the portion of the invented voting machine involved in the second scan and in providing the necessary signals for driving the histogram displays. Each voter terminal includes, in addition to the shift register 68 and the weighting switch 26 discussed in connection with FIG. 3, the selection switch 24 which has one input from a corresponding numbered AND-gate 74 and has 11 outputs connected to an OR-gate 76 and to the correspondingly numbered AND-gates 78. The second scan starts when the seventeenth output of the counter 51 is actuated to enable the AND-gates 72–1 associated with the first voter terminal. (There are 16 AND-gates 72 each associated with the correspondingly numbered voter terminal.) While the seventeenth output of the counter 51 is active, and the AND-gate 72–1 is enabled, the number of clock pulses passed to the shift register 68–1 corresponds to the setting of the weighting switch 26–1, as discussed in connection with FIG. 3. These clock pulses, if any, are passed to the selection switch 24–1 through the associated AND-gate 74–1 which is enabled concurrently with the corresponding AND-gate 72–1. The switch 24–1 comprises 11 switches connected in parallel and the clock pulses from the AND-gate 74–1 pass only through the closed one of these eleven switches, to be applied to the OR-gate 76 and to only the correspondingly numbered one of the AND-gates 78. The output of the OR-gate 76 is applied to the single numerator counter 63 which can be used in place of the 11 numerator counters 62–0 through 62–10 of FIG. 2.

In operation of the circuit shown in FIG. 4, the AND-gates 72–1 and 74–1 are enabled for the duration of four clock pulses from the clock 50 and up to four clock pulses, depending on the setting of the weighting switch 26–1, are applied to the numerator counter 63, to be counted therein, while the AND-gate 78 whose number corresponds to the closed one of the eleven parallel switches forming the selector switch 24–1 is enabled, to thereby pass to the selection counter the output of the normalizing circuit 65, this output being the contents of the numerator counter 63 divided by the contents of the total weights counter 54, as normalized to a scale of 10. For example, if the first voter had selected answer No. 5 and had selected a 75% confidence in that answer, the numerator counter 63 contains the count of 3 and the selection counter 64–5 (not shown) contains a number which is the quotient of 3 divided by the total number of weights accumulated in the counter 54 as discussed in connection with FIG. 3. At the end of the first four clock pulses of the second scan, the numerator counter 63 is cleared by a pulse from the scanner counter 51, and at the beginning of the next sequence of four clock pulses the AND-gates 72–2 and 74–1 associated with the second voter terminal (not shown) are energized, etc. until all voter terminals have been similarly scanned. The downstroke of the output 51–32 of the counter 51, after the last clock pulse of the second scan, sets a flip-flop 78 whose output enables each of AND-gates 80–0 through 80–10 to apply the contents of the selection counters 64–0 through 64–10 to the correspondingly numbered drivers 82–0 through 82–10 for the correspondingly numbered columns 32–0 through 32–10 of the display panel 22.

Figure 5:
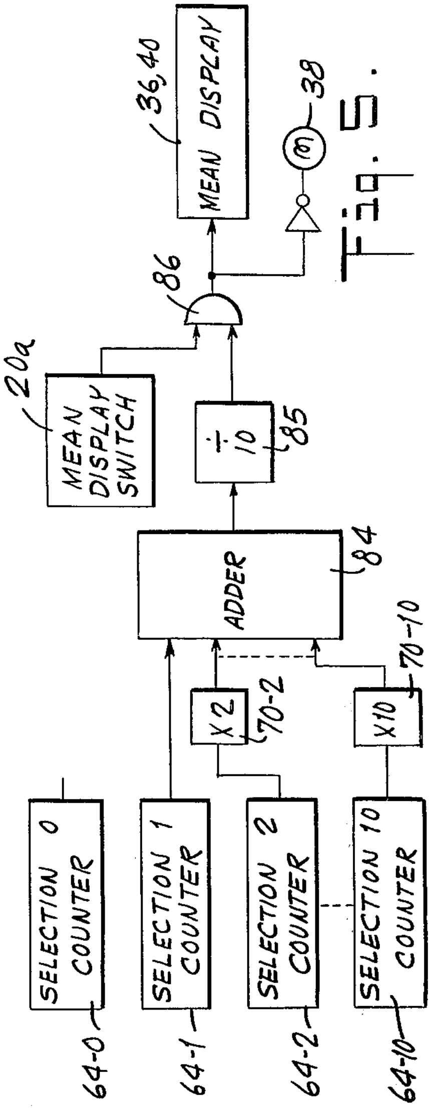
FIG. 5 is a block diagram of the machine portion concerned with measuring a weighted mean of the displayed voting results.

FIG. 5 is a more detailed showing of the circuit concerned with measuring and displaying a weighted mean of the voting results. As discussed earlier, the weighted mean is calculated by multiplying the contents of each of the selection counters 64–0 through 64–10 by the number of the counter and then displaying the resulting product on a scale of 10. Referring to FIG. 5, the contents of the selection counter 64–0 are not considered for the weighted mean because the multiplication factor for this counter is 0, but the contents of each of the remaining selection counters 64–1 through 64–10 are multiplied by a correspondingly numbered one of the multipliers 70–2 through 70–10 (the multiplication factor for counter 64–1 is 1) and the multiplier outputs are applied to an adder 84 where they are added to each other. The outputs of the adder 84 are divided by 10 at a divider 85, to arrive at a weighted mean on a scale of 10, and this weighted mean is applied to the mean display of the display panel 22 through AND-gate 86 which is enabled by the manual operation of the mean display switch **20*a* of the remote control terminal 20. While the weighted mean is displayed at the display 36, the indicator light 40 is lit and the count indicator light 38** is turned off.

Either after the calculation and display of the histograms or after the calculation and display of the weighted mean in case the mean switch **20*a* (or the mean switch 41) has been energized, the voting machines goes into a quiescent state. For a new vote, each voter unplugs his voter terminal to make a new selection of the switches 24 and 26. Note that when either of scan buttons 20*b* and 42 is energized, the machine is reset on the downstroke of the button and a scan starts in the upstroke. The machine can alternately be reset by manually operating the reset switch 20*c* of the remote control terminal or the reset switch 44 of the display 22. Still alternately, a suitable time delay (not shown) may be connected between the scan and reset switches 20*b* and 20*c* to automatically reset the circuit a predetermined time interval after the operation of the scan switch 20*b*, whereby the machine can automatically be reset, for example, ninety seconds after the scan switch 20*b*** is operated.

Each of the individual elements shown in the drawings is a prior art device, and the invention relates to the specific combination of such prior art elements which results in the invented system. Referring to FIG. 1 for example, the display panel 22 comprises eleven columns 32 each formed to two parallel, upwardly extending rows each having fifty light bulbs 33 behind ground glass. The bottom pair of bulbs is lit to indicate that 2% of the votes are for that answer, the bottom two pairs of bulbs of a column are lit to indicate that 4% of the votes are for that selection, etc. Since there are two columns of fifty light bulbs for each of the histograms, the display is redundant in that an answer will be indicated properly even if one of each pair of horizontally adjacent bulb burns out. The weight display 34 has two digits each comprising seven segments, with each segment having a light bulb behind ground glass, and one digit which comprises a single upright segment with a light bulb behind it, and the display 36 is similar. Each of the indicators 38 and 40 is a light bulb behind ground glass. Referring to FIG. 2, and assuming decimal operation throughout for simplicity, the clock 50 can be any suitable oscillator which can be turned on by either of the scan switches **20*b* and 42; the voter count selector 46 is a rotary switch having sixteen positions; the number of voters counter 48 is a decimal counter which can be set to 16 and has a down count input to decrement the counter contents by 1 with each pulse from the scanner 52; the displays 34 and 36 include suitable decoding matrices (not shown) to decode the contents of the corresponding divider 58, the counter 48 and the calculator 66 respectively into the suitable pattern of light bulb drivers (not shown) for indicating the contents of the counter 46; the total weights counter 54 is a decimal counter which can count up to 64; each of the numerator counters 62 is a decimal counter which can count up to 64; the normalizing circuit is a fast decimal divider, as is the divider 58; each of the selection counter 64 is a decimal counter-adder which can count up to 100; and the divide-by-4 circuit 60 can be a serial combination of two flipflops. Referring to FIG. 3, the shown portion of the counter 51 is a ring counter with sixteen outputs which energizes a single successive output with each pulse from the divider 50***a;* and the shift register 68 has four stages and each successive pulse from the corresponding OR-gate 53 turns on another stage of the register 68. Referring to FIG. 4, the shown portion of the counter 51 is similar to the portion discussed in connection with FIG. 3, and the drivers 82–0 are suitable power supplies and decoding networks for turning on the lamas of the corresponding columns up to a height proportional to the contents of the corresponding selection counter. Finally, referring to FIG. 5, each of the multipliers 70–2 through 70–10 is a decimal multiplier multiplying its input by the indicated factor; the adder 84 is a parallel decimal adder adding the indicated 10 inputs and the divider 85 is a decimal divider dividing its input by 10. While no wireless connection has been expressly disclosed, it should be clear that conventional circuits can be used to transmit by modulated carrier the signals which are exchanged between the voter terminals, the central control, the remote control and the display, so that a group of voters can use terminals that are free of connecting wires.

We claim:

1. A voting machine having a voter terminal for each voter, a central control and a display electrically connected to each other, comprising;

means in each voter terminal for establishing therein an electrical circuit corresponding to the voter selection of an alternative answer to a question and for additionally establishing therein an electrical circuit corresponding to the voter selection of the voter degree of confidence in the selected alternative answer;

means in the central control for deriving a digital electrical signal corresponding to each established electrical circuit and for combining the derived digital electrical signals to thereby derive a digital denominator signal corresponding to the cumulative confidence of all voters in all alternative answers selected thereby and for additionally deriving, for each alternative answer, a digital numerator signal corresponding to the cumulative degree of confidence of all voters in the alternative answer;

means in the display for visually-displaying, for each alternative answer, an indication, on a scale of a selected radix, of the ratio of the corresponding numerator digital signal and said signal denominator signal, thereby displaying an indication reflecting both the selection of alternative answers by the voters and the degree of confidence of the voters in the selected alternative answers; and wherein the central control includes means for combining selected ones of said digital signals to derive thereby an electrical signal corresponding to a selected weighted means of the displayed ratio indications, and the display includes means for displaying an indication of the last recited electrical signal.

2. A voting machine as in claim 1 including means for selecting the number of voters who are to participate in a vote, means for comparing the number of signals derived from the electrical circuits established in the voter terminals with said selected number of voters and means for preventing the display of said ratio indications in case of a discrepancy in said comparison resulting from any inequality between the compared numbers.

3. A voting machine as in claim 1 wherein the means in the central control for deriving said electrical signals comprise means for scanning the voter terminals in a first scan to derive said denominator signal and means for scanning the voter terminals in a second scan to derive said numerator signals.

4. A voting machine as in claim 1 wherein each voter terminal includes means for providing up to N counts for a selected alternative answer, where N is a positive integer, the number of counts indicating the voter degree of confidence in the selected alternative answer, and the means for deriving the electrical signals comprise means for totalling all counts for all alternative answers from the voter terminals to derive the denominator signal and means for individually totalling the counts for each alternative answer from the voter terminals to derive said numerator signals.

5. A voting machine having a voter terminal for each voter, a central control and a display electrically connected to each other, comprising:

means in each voter terminal for establishing therein an electrical signal corresponding to the voter selection of one alternative answer to a question and for additionally establishing therein an electrical circuit corresponding to the voter selection of the voter degree of confidence in the selected alternative answer;

means in the central control for deriving a digital electrical signal corresponding to each established electrical circuit and for combining the derived digital electrical signals to thereby derive a digital denominator signal corresponding to the cumulative confidence of all voters in all alternative answers selected thereby and for additionally deriving, for each alternative answer, a digital numerator signal corresponding to the cumulative degree of confidence of all voters in the alternative answer;

means in the display for visually displaying, for each alternative answer, an indication, on a scale of a selected radix, of the ratio of the corresponding numerator digital signal and said digital denominator signal, thereby displaying an indication reflecting both the selection of alternative answers by the voters and the degree of confidence of the voters in the selected alternative answers; and wherein the central control includes means for deriving an electrical signal corresponding to the number of voters participating in a vote and an electrical signal corresponding to the number of voter terminals which have established an electrical circuits, means for comparing the two last recited electrical signals and means for providing an error electrical signal in case of a discrepancy resulting from any inequality between the compared signals at the time of combining said derived electrical signals, and wherein the display includes means for providing an indication of such error signal.

6. A voting machine having a voter terminal for each voter, a central control and a display electrically connected to each other, comprising:

means in each voter terminal for establishing therein an electrical circuit corresponding to the voter selection of an alternative answer to a question and for additionally establishing therein an electrical circuit corresponding to the voter selection of the voter degree of confidence in the selected alternative answer;

means in the central control for deriving a digital electrical signal corresponding to each established electrical circuit and for combining the derived digital electrical signals to thereby derive a digital denominator signal corresponding to the cumulative confidence of all voters in all alternative answers selected thereby and for additionally deriving, for each alternative answer, a digital numerator signal corresponding to the cumulative degree of confidence of all voters in the alternative answer;

means in the display for visually displaying, for each alternative answer, an indication on a scale of a selected radix, of the ratio of the corresponding numerator digital signal and said digital denominator signal, thereby displaying an indication reflecting both the selection of alternative answers by the voters and the degree of confidence of the voters in the selected alternative answers; and wherein the central control includes means for providing an electrical signal corresponding to a selected number of voters and means for decrementing the last recited signal for each voter terminal from which said digital signals corresponding to the established circuits have been derived, and wherein the display includes means for displaying an indication of the selected number of voters and means for decrementing the last recited indication with the decrementing of said electrical signal corresponding to the selected number of voters.

7. A voting machine as in claim 6 wherein the display comprises a plurality of redundant electrical lamps arranged in a column for each of said ratios and means for energizing the lamps of each column to a height proportional to the value of the corresponding ratio.

8. A method of operating a voting machine having a voter terminal for each voter, a central control and a display electrically connected to each other, comprising the steps of:

operating each voter terminal to establish therein an electrical circuit corresponding to the voter selection of an alternative answer to a question and to establish therein an electrical circuit corresponding to the confidence of the voter in the selected alternative answer;

operating the central control to derive a digital electrical signal corresponding to each established electrical circuit and to combine the derived digital electrical signals to thereby derive a denominator signal corresponding to the cumulative confidence of all voters in all alternative answers selected thereby and to derive, for each alternative answer, a numerator signal corresponding to the cumulative confidence of all voters in the alternative answer;

operating the display to visually display, for each alternative answer, an indication, on a scale of a selected radix, of the ratio of the corresponding numerator signal and said denominator signal thereby displaying an indication reflecting both the selection of alternative answers by the voters and the degree of confidence of the voters in the selected alternative answers; and wherein the step of operating the central control includes the substep of combining selected ones of said signals to derive thereby an electrical signal corresponding to a weighted mean of the displayed ratio indications, and the step of operating the display includes the substep of displaying an indication of the last recited electrical signal.

9. A method of operating a voting machine as in claim 8 wherein said radix is 100 and the step of operating the display includes the step of normalizing each ratio indication to a scale of 100 and visually displaying the normalized ratio indications.

10. A method of operating a voting machine as in claim 8 including the steps of selecting the number of voters who are to participate in a vote, comparing the number of electrical signals derived from the electrical circuits established in the voter terminals with said selected number of voters and preventing the displaying of said ratio indications in case of a discrepancy resulting from any inequality between the compared numbers.

11. A method of operating a voting machine having a voter terminal for each voter, a central control and a display electrically connected to each other, comprising the steps of:

operating each voter terminal to establish therein an electrical circuit corresponding to the voter selection of an alternative answer to a question and to establish therein an electrical circuit corresponding to the confidence of the voter in the selected alternative answer;

operating the central control to derive a digital electrical signal corresponding to each established electrical circuit and to combine the derived digital electrical signals to thereby derive a denominator signal corresponding to the cumulative confidence of all voters in all alternative answers selected thereby and to derive, for each alternative answer, a numerator signal corresponding to the cumulative confidence of all voters in the alternative answer;

operating the display to visually display, for each alternative answer, an indication, on a scale of a selected radix, of the ratio of the corresponding numerator signal and said denominator signal thereby displaying an indication reflecting both the selection of alternative answers by the voters and the degree of confidence of the voters in the selected alternative answers; and wherein the step of operating the central control indluces the substeps of deriving an electrical signal corresponding to the number of voters and an electrical signal corresponding to the number of voter terminals which have established an electrical circuit, comparing the two last recited electrical signals and providing an error electrical signal in case of a decrepancy resulting from any inequality therebetween, and wherein the step of operating the display includes the substep of providing an indication of such error signal.

12. A method of operating a voting machine having a voter terminal for each voter, a central control and a display electrically connected to each other, comprising the steps of:

operating each voter terminal to establish therein an electrical circuit corresponding to the voter selection of an alternative answer to a question and to establish therein an electrical signal corresponding to the confidence of the voter in the selected alternative answer;

operating the central control to derive a digital electrical signal corresponding to each established electrical circuit and to combine the derived digital electrical signals to thereby derive a denominator signal corresponding to the cumulative confidence of all voters in all alternative answers selected thereby and to derive, for each alternative answer, a numerator signal corresponding to the cumulative confidence of all voters in the alternative answer;

operating the display to visually display, for each alternative answer, an indication, on a scale of a selected radix, of the ratio of the corresponding numerator signal and said denominator signal thereby displaying an indication reflecting both the selection of alternative answers by the voters and the degree of confidence of the voters in the selected alternative answers; and wherein the step of operating the central control includes the substeps of providing an electrical signal corresponding to a selected number of voters and decrementing the last recited signal for each voter terminal from which said digital signals corresponding to the established circuits have been derived, and wherein the step of operating the display includes the substep of displaying an indication of the selected number of voters and decrementing the last recited indication with the decrementing of said electrical signal corresponding to the selected number of voters.

13. A method of operating a voting machine as in claim 12 wherein the step of operating the display comprises providing a plurality of redundant electrical lamps arranged in a column for each of said ratios and energizing the lamps of each column to a height proportional to the value of the corresponding ratio.

* * * * *

UNITED STATES PATENT AND TRADEMARK OFFICE
CERTIFICATE OF CORRECTION

PATENT NO. : 3,947,669

DATED : March 30, 1976

INVENTOR(S) : William W. Simmons and James A. Marquis

It is certified that error appears in the above-identified patent and that said Letters Patent are hereby corrected as shown below:

Column 2, line 3, "machines", should read -- machine --.

Column 2, line 51, "12", should read -- 32 --.

Column 3, line 11, "of", should read -- or --.

Column 3, line 15, insert quotation marks after "100%".

Column 4, lines 4 and 5, "dimensioned", should read -- decremented --.

Column 4, line 53, "the", should read -- that --.

Column 9, line 27, "lamas", should read -- lamps --.

Column 9, line 63, delete hyphen between "visually displaying".

Column 10, line 6, "means", should read -- mean --.

Column 11, lines 1 and 2, "circuits", should read -- circuit --.

Column 12, line 64, "indluces", should read -- includes --.

Column 13, line 14, "signal", should read -- circuit --.

Signed and Sealed this

Second Day of November 1976

[SEAL]

*Attest:*

RUTH C. MASON
*Attesting Officer*

C. MARSHALL DANN
*Commissioner of Patents and Trademarks*